(12) United States Patent
Cho et al.

(10) Patent No.: US 9,338,239 B2
(45) Date of Patent: May 10, 2016

(54) USER PROFILE-BASED DEVICE ACCESS CONTROL METHOD AND APPARATUS

(71) Applicant: Samsung Electronics Co., Ltd., Gyeonggi-do (KR)

(72) Inventors: Hyungrae Cho, Seoul (KR); Jihyeon Kweon, Gyeonggi-do (KR); Seokmin Oh, Gyeonggi-do (KR); Kangmin Lee, Gyeonggi-do (KR); Yousef Kharsim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 47 days.

(21) Appl. No.: 13/629,033

(22) Filed: Sep. 27, 2012

(65) Prior Publication Data

US 2013/0086700 A1   Apr. 4, 2013

(30) Foreign Application Priority Data

Sep. 30, 2011   (KR) ........................ 10-2011-0099804

(51) Int. Cl.
*H04L 29/06* (2006.01)
*H04L 29/08* (2006.01)
*G06F 21/62* (2013.01)

(52) U.S. Cl.
CPC .......... *H04L 67/125* (2013.01); *G06F 21/6218* (2013.01); *H04L 63/102* (2013.01); *H04L 67/303* (2013.01); *H04L 67/306* (2013.01)

(58) Field of Classification Search
CPC ......... H04L 63/00; G06F 21/30; G06F 21/50; G06F 9/00
USPC .......... 726/1, 2, 5, 6, 18, 19, 27, 30; 707/621, 707/694, 748, 758, 778, 784, 786
See application file for complete search history.

(56) References Cited

U.S. PATENT DOCUMENTS

| 2005/0097595 | A1* | 5/2005 | Lipsanen et al. ................. 725/25 |
| 2006/0008256 | A1* | 1/2006 | Khedouri et al. ............. 386/124 |
| 2006/0137005 | A1  | 6/2006 | Park |
| 2009/0223128 | A1  | 9/2009 | Kuschak |

FOREIGN PATENT DOCUMENTS

| EP | 1 530 115      | 5/2005  |
| KR | 1020090010553  | 1/2009  |
| KR | 1020090020164  | 2/2009  |
| WO | WO 02/102019   | 12/2002 |

OTHER PUBLICATIONS

European Search Report dated Mar. 5, 2015 issued in counterpart application No. 12835718.3-1870.

* cited by examiner

*Primary Examiner* — Joseph P Hirl
*Assistant Examiner* — Leynna Truvan
(74) *Attorney, Agent, or Firm* — The Farrell Law Firm, P.C.

(57) ABSTRACT

A method and apparatus for configuring electronic devices is provided. The method includes collecting, at a device management apparatus, user information regarding a user within a predetermined area; and controlling access to an electronic device based on the user information.

16 Claims, 13 Drawing Sheets

USER PROFILE-BASED DEVICE ACCESS CONTROL METHOD AND APPARATUS

PRIORITY

This application claims priority under 35 U.S.C. §119(a) to Korean Patent Application No. 10-2011-0099804, which was filed in the Korean Intellectual Property Office on Sep. 30, 2011, the entire disclosure of which is incorporated herein by reference.

BACKGROUND OF THE INVENTION

1. Field of the Invention

The present invention relates generally to a system interconnecting a plurality of electronic devices, an electronic device management apparatus, a terminal, and a server and, in particular, a method and apparatus for restricting access to the devices based on user profile.

2. Description of the Related Art

Various electronic devices have recently been developed. Such electronic devices include electric appliances for home use and electric instruments for office and factory use.

For example, electronic devices can include lighting devices such as florescent lamps and incandescent lamps, temperature control devices such as air conditioners and heaters, and other appliances such as laundry machines, TeleVisions (TVs), computers, electric fans, and refrigerators.

With electric communication technology advancing, it has become possible to control the electronic devices remotely through a network.

The electronic devices are connected to the device management apparatus through wired or wireless links to form a network, and the device management apparatus is connected to a terminal through a wired or wireless link. The user can input a command to the terminal for powering on and off and executing various functions of the electronic devices remotely. That is, the user controls the electronic devices remotely by means of the terminal. Most of the electronic devices including TVs, refrigerators, laundry machines, microwave oven, vacuum cleaner, and the like is controlled remotely in this way.

Such a system of interconnecting the electronic devices to a network in order to manage them is a "home network system". A home network system is implemented with a home gateway or a home server to which the electronic devices (e.g. TVs, laundry machines, microwave ovens, gas ovens, audios, air conditioners, boilers, and the like), lighting lamps, gas valves, and doors such that the user controls the electronic devices by using a terminal (e.g., remote controller).

Recently developed application devices support sharing data for providing the home network service and/or communication-broadcast convergence service.

Digital Living Network Alliance (DLNA) is one of the most widely adopted digital content sharing protocol work group as an descendant of Digital Home Working Group (DHWG) which was established in June 2003 as an official cooperation organization for home network commercialization.

DLNA aims to implement a vision of an interoperable network with the development of a platform compatible with the protocols that are already standardized. DLNA promotes the introduction of company guidelines based on Universal Plug and Play (UPnP) that is widely adopted by electric appliances, Personal Computers (PCs), and radio communication apparatus manufacturers.

UPnP is a technology that eliminates the complexity of adding devices to a network and allows a device to discover another device connected to the network.

The currently-issued DLNA guideline aims to provide the design principle of supporting sharing of content among electric appliances including PCs and radio communication devices manufactured by different manufacturers and for different purposes. The products designed according to the guideline can share the content such as music, pictures and videos through the home network.

In order to facilitate the sharing of content among indoor devices interconnected through a DLNA-based home network, a home network data sharing system must control the service provision considering the device characteristics and communication environment and support interworking with various servers connected through communication networks to improve the service quality.

In such a home network environment, the electronic devices connected to the device management apparatus through the network are used by different users. These electronic devices are accessed by any of users without restriction.

Accordingly, if a child accesses an electronic device requiring the exercise of caution (such as a microwave oven and gas oven) without adult supervision, it may cause a dangerous situation such as gas leakage and fire.

In order to protect children from certain electric devices, it is necessary to restrict access to such electric devices.

Also, improper use of such electronic devices may cause these devices to break down.

There is therefore a need of a method for restricting the use of electronic devices.

SUMMARY OF THE INVENTION

Accordingly, the present invention has been made to solve the above-stated problems occurring in the prior art, and an aspect of the present invention provides a method and for restricting access to electronic devices based on the user profile in a system internetworking a plurality electronic devices, a device management apparatus, mobile terminals, and servers.

In accordance with an aspect of the present invention, a method for configuring electronic devices is provided. The method includes collecting, at a device management apparatus, user information regarding a user within a predetermined area; and controlling access to an electronic device based on the user information. In accordance with another aspect of the present invention, a device management apparatus is provided. The apparatus includes a blocking unit for blocking access to an electronic device; a communication unit for collecting user information; and a control unit for controlling the blocking unit based on the user information. In accordance with another aspect of the present invention, a terminal for controlling access to electronic devices is provided. The terminal includes a storage unit for storing user information including a predetermined usage level; a display unit for displaying a list of electronic devices; and a control unit for controlling the display unit to display the list of electronic devices to which access is restricted according to the user information.

In accordance with still another aspect of the present invention, an electronic device access control system is provided. The system includes a terminal for providing user information including respective usage levels; a device management apparatus for checking the usage level of the user information provided by the terminal and restricts access to electronic device according to the usage level; and an electronic device to which access is restricted under the control of the device management apparatus.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Embodiments of the present invention are described with reference to the accompanying drawings in detail. The same reference numbers are used throughout the drawings to refer to the same or like parts, and some elements may be exaggerated in size and thickness for simplicity purposes.

Detailed description of well-known functions and structures incorporated herein may be omitted to avoid obscuring the subject matter of the present invention, and also detailed description of the elements having substantially same structures and functions may be omitted too.

Figure 1:
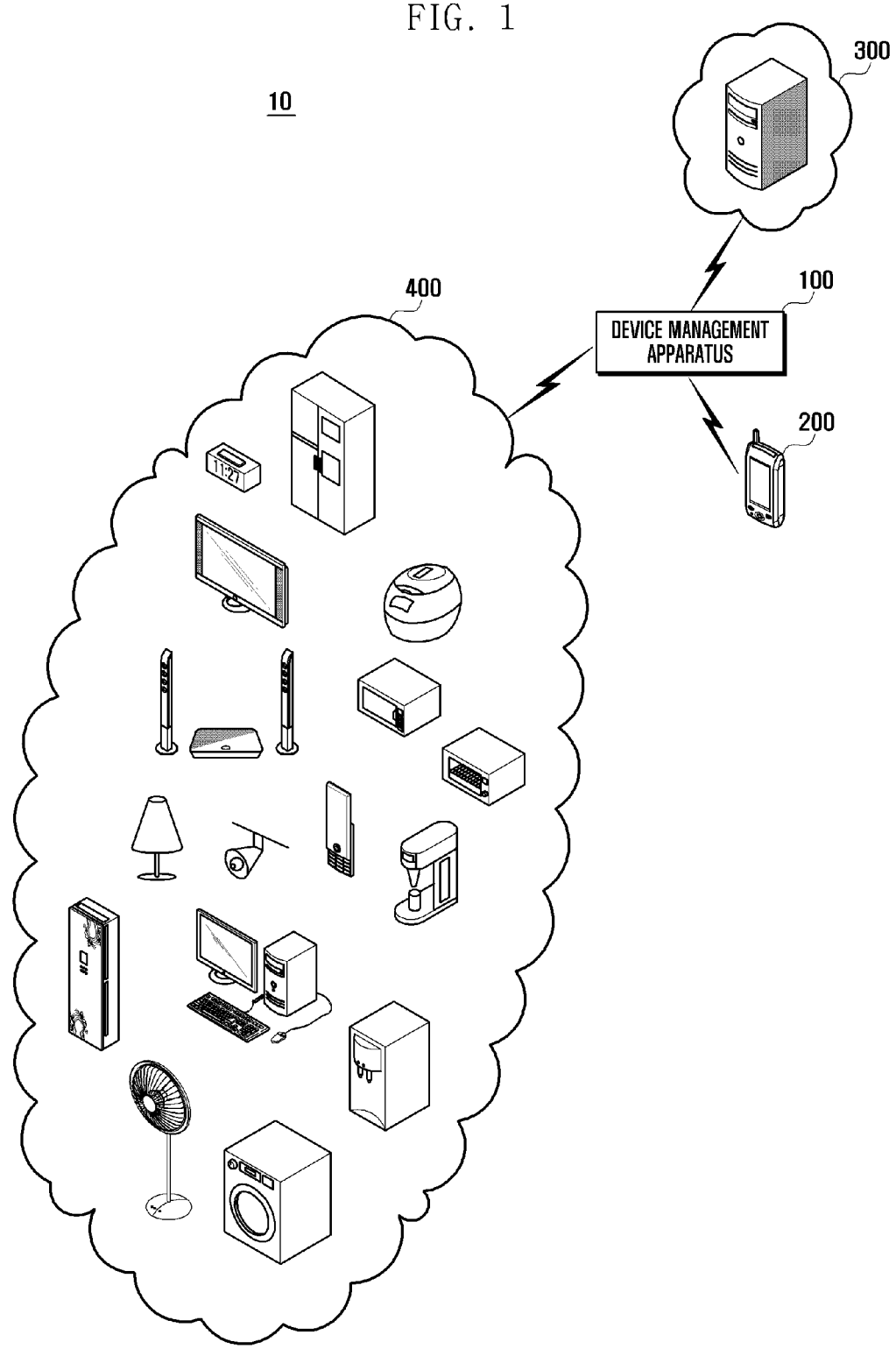
FIG. 1 is a diagram illustrating a device management system according to an embodiment of the present invention.

FIG. 1 is a diagram illustrating a device management system according to an embodiment of the present invention.

As shown in FIG. 1, the device management system according to an embodiment of the present invention includes a management apparatus 100, a terminal 200, a server 300, and a plurality of electronic devices 400.

The device management apparatus 100 controls the electronic devices 400. Specifically, the device management apparatus 100 stores the identity information, operation pattern, and software version of the electronic devices 400 and controls execution of the electronic devices.

In the electronic device management system 10, the terminal 200 is one of a smartphone and tablet PC. The terminal 200 receives user input through its Graphical User Interface (GUI) and controls a specific electronic device remotely. The terminal 200 sends an execution command for a specific electronic device to the device management apparatus 100 such that the device management apparatus 100 delivers the execution command to the corresponding electronic device.

The server 300 can send a device control command to the device management apparatus 100 in response to the request form the device management apparatus 100 or by using a push method.

The control command is a power-on or off command addressed to multiple electronic devices 400.

The device management apparatus 100 controls the individual electronic devices 400 with the device-specific control command.

In the electronic device management system 10, the terminal 200 provides the device management apparatus 100 with the information on the users sorted into different levels, the device management apparatus checks the user profile to restrict access to an electronic device based on the usage level of the user.

In an embodiment of the present invention, the device management apparatus 100 configures the usage or access rights to each electronic device 400 according to the usage level and control access of the users to each electronic device 400 based on the usage level.

Specifically, the device management apparatus 100 collects user profile on a user located within a predetermined area and controls the access of the user to a specific electronic device 400 based on the user profile.

The device management apparatus 100 can categorize the users into different usage levels to restrict the users having the usage level lower than the allowed usage level to a specific device. The device management apparatus 100 also is configured to identify the subordinate relationship among the users on whom information is collected within a predetermined area and control the access to the respective devices according to the subordinate relationship differentially.

In the electronic device management system 10 according to an embodiment of the present invention, the terminal 200 is configured to perform the functions of the device management apparatus 100. For example, the terminal 200 checks the usage level of a user and restricts the access of the user to an electronic device 400 based on the user's usage level. The electronic device 400 is controlled by the terminal 200, such that the access to the corresponding device 400 is blocked.

A description will be made of the device management apparatus 100 in detail.

Figure 2:
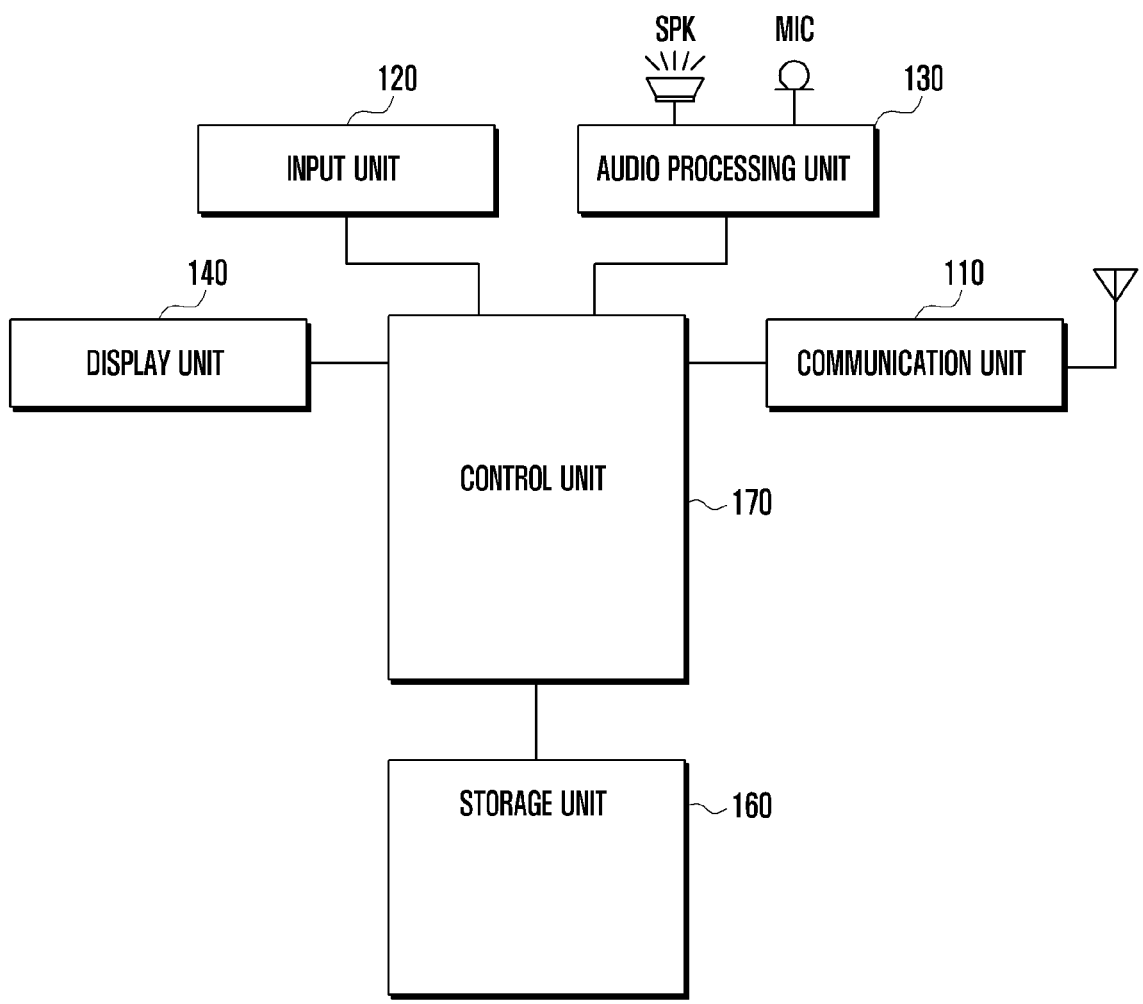
FIG. 2 is a block diagram illustrating the device management apparatus of FIG. 1.

FIG. 2 is a block diagram illustrating the device management apparatus of FIG. 1.

As shown in FIG. 2, the device management apparatus 100 according to an embodiment of the present invention includes a communication unit 110, an input unit 120, an audio processing unit 130, a display unit 140, a storage unit 160, and a control unit 170.

The communication unit 110 is responsible for establishing a wired or wireless communication channel for communicating control signals and data under the control of the control unit 170.

The communication unit 110 establishes communication channels with the terminal 200, the server 300, and the electronic devices 400 constituting the device management system 10 according to an embodiment of the present invention.

The communication unit 110 transmits data through the data communication channel for integral management of the members of the device management system 10 under the control of the control unit 170.

For example, the communication unit 110 receives a device management control command from the server 300 or the terminal 200 or one of the electronic devices 400 and forwards the received device management control command to a specific electronic device 400.

The input unit 120 receives alphabetic or numeric information input and includes input means for configuring various functions. For example, the input unit 120 generates a configuration control signal to the control unit 170. The control unit 170 generates a device management control command for power-on/off of the electronic devices 400 according to the received configuration control signal.

The audio processing unit 130 can include a speaker for playing out audio data according to the execution mode or selected function of the device management apparatus 100 and a MICrophone (MIC) for receiving voice input from the user.

The audio processing unit 130 can output an alert or sound effect when a user accesses the electronic devices 400.

The audio processing unit 130 is also configured to output an alarm sound for alarming the power-on or off of the electronic devices.

The audio processing unit 130 is also configured by the user to operate without a sound effect.

The display unit 140 displays the information input by the user and to provides the user various menus of the device management apparatus 100. That is, the display unit 140 can provide the user with a status notification screen and a list of the electronic devices available per user. The display unit 140 can display various user screen interfaces according to an embodiment of the present invention.

The storage unit 160 stores an application program necessary for the operation of the device management apparatus 100 and user and application data such as messages communicated with other components in the device management system 10 and generated with the execution of the application programs.

The storage unit 160 stores the Operating System (OS) responsible for booting up the device management apparatus 100 and application programs for controlling the electronic devices 400.

Specifically, the storage unit 160 controls the programs for controlling the powering on or off of the electronic devices and information on the users using the electronic devices.

The control signal for powering the electronic devices 400 on or off is received through the data communication channel established between the server 300 and the device management apparatus 100 under the control of the control unit 170.

The control unit 170 controls the operation of the electronic devices 400 according to the execution command for remote control and power-on/off of the electronic devices 400 according to the device management control command, determines whether to permit or reject the access to the electronic devices 400 according to the acquired user profile, and takes actions according to such determination result.

Particularly, the control unit 170 collects the information on a user within a predetermined range and control the access to the electronic device based on the collected user profile.

The control unit 170 sorts the users into different usage levels and control the access to the electronic devices based on the usage level of the users. The control unit 170 also checks the hierarchical subordinate relationship among the users and control the access to the electronic device based on the hierarchical relationship.

Figure 3:
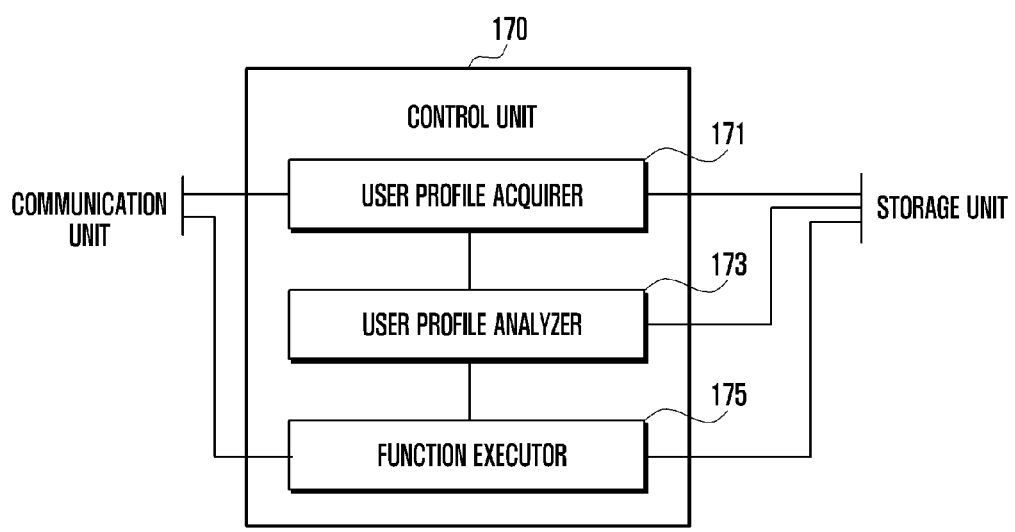
FIG. 3 is a block diagram illustrating the control unit 170 of FIG. 2.

FIG. 3 is a block diagram illustrating a configuration of the control unit 170 of FIG. 2.

The control unit 170 includes a user profile acquirer 171, a user profile analyzer 173, and a function executor 175.

The information acquirer 171 acquires information on the terminal 200 by means of the communication unit 110.

The terminal information includes user profile and identity information of the terminal 200.

The user profile acquirer 171 sends the terminal information to the user profile analyzer 173.

The user profile analyzer 173 analyzes the terminal information provided by the user profile acquirer 171.

The user profile analyzer 173 compares the analyzed terminal information with the previously registered terminal information.

If the terminal information is identical to the information registered with the server 300, the user profile analyzer grants the access right to the electronic devices 400.

The user profile analyzer 173 analyzes the usage level of the user based on the terminal information of the connected terminal 200, i.e. depending on whether the user level of the terminal 200 includes an adult level and a child level.

If it is determined that the user of the terminal is an adult, the access right to the electronic devices 400 are granted to the terminal 200. The user level is sub-classified into the sublevels according to the adult properties (e.g., sex, age, type of device to access and the like).

For example, if the user of the terminal 200 is the father of the family, access rights to the sewing machine, microwave oven, and laundry machine may be restricted. However, if the user of the terminal 200 is the mother of the family, access rights to such electronic devices may be granted to the terminal.

If it is determined that the user of the terminal is a child, the highly restricted permission to the specific electronic devices is granted to the terminal 200. The user level is sub-classified into the sublevels according to the child properties (e.g., sex, age, and type of device to access).

For example, if the user of the terminal 200 is a child, access to the gas oven, microwave oven, vacuum cleaner, and laundry machine is restricted.

In case that there are multiple user profiles acquired by the user profile acquirer 171, the user profile analyzer 173 compares the user profiles with each other to select the user profile with the highest usage level.

For example, assuming that the mother and the child use the first and second terminals respectively, the user profiler acquirer 171 acquires the terminal information on both the first and second terminals. The user profile analyzer 173 compares the user profiles acquired from the first and second terminals and selects the mother's user profile which has a usage level higher than that of the child's access right. If the terminal information is acquired from the terminals retaining the user profiles with high and low usage levels simultaneously, the user profile analyzer 173 assumes that two users, one having a high usage level and the other having a low usage level, are in the same area so as to permit the access to the electronic devices by referencing the user profile with higher usage level. For example, if it is determined that a child is accompanying with an adult, the user profile analyzer 173 grants the access right to the electronic devices by referencing the usage level of the adult.

Accordingly, when there are multiple terminals in the predetermined range, the control unit 170 determines the highest usage level extracted from the user profiles acquired from the terminals as the final usage level to use.

If the user profile comparison fails, it is possible to check the types of the electronic devices registered in association with the terminal information and select the terminal information having the access right to more electronic devices than others.

In the case that the usage level of the terminal 200 is registered with the server 300, the control unit 170 selects the terminal information to be used according to the registered usage level of the terminal 200.

The terminal information acquired by the user profile acquirer is transferred to the storage unit 160.

The data analyzed by the user profile analyzer 173 is stored in the storage unit 160.

In the case that the terminal information differs from the information registered with the server 300, the access to the electronic devices 400 via the terminal 200 is rejected.

A dialog window asking for registering an unregistered terminal with the server 300 is then displayed on the screen of the terminal 200.

The user registers an unregistered terminal with the server 300 to acquire the access right to the electronic devices 400.

The function executor 175 generates control commands for the electronic devices 400 based on the information analyzed by the user profile analyzer 173 and sends the control commands to the electronic devices 400. Particularly, the function executor 175 generates the control command to the electronic devices 400 to which access is granted according to the user profile based on the terminal information analyzed by the user profile analyzer 173.

The usage level-based device access control method according to an embodiment of the present invention is implemented by deactivating the icons representing the access-restricted electronic devices and activating the icons representing the access-permitted electronic devices according to the access rights granted to the terminal.

According to another embodiment of the present invention, the electronic devices 400 are configured such that the power supply to the electronic devices 400 is turned on or off based on the level of the access right granted to the terminal 200. For example, if an execution command for a specific electronic device is received from a certain terminal 200, the function executioner 175 cuts off the power to the electronic device to block the access to the corresponding device based on the information of the terminal attempting to access the electronic device.

Along with the control of the electronic devices 400 by means of the terminal 200, each electronic device is equipped with a display on which the user manipulate the electronic device. If a control request is received, each electronic device 400 sends an interrupt to the device management apparatus 100 in response to the control request such that the control unit 170 of the device management apparatus 100 checks the user level and determines whether to operate the corresponding electronic device according to the user level.

If a new user profile is acquired, the user profile acquirer 171 determines the user level based on the user profile.

If it is determined that the user profile has the highest user level, the access rights for controlling the electronic device are updated to those of the highest user level. If it is determined that the user profile has a dependent level, the access attempt to the electronic device 400 is allowed or rejected based on the preset user level without update.

According to an embodiment of the present invention, when there are multiple user profiles, the access rights are configured according to the subordinate relationship among the user profiles.

According to an embodiment of the present invention, even in the highest level access restriction environment, if the access-permitted electronic device 400 is marked by red-level (i.e., dangerous), it is required to pass an authentication process. The heating devices such as microwave oven and gas oven is marked by the red-level.

The access control to the electronic devices 400 is implemented with on/off switches that the device management apparatus 100 turns on and off to control the power supply to the respective electronic devices according to the user level.

The control unit 170 includes a blocking unit (not shown) for blocking access to the electronic devices 400.

For example, the blocking means controls the switch per electronic device 400 to cut off the power supply to the electronic device.

The cutoff means includes a switch control module for determining whether to supply power to electronic devices and a user interface module for blocking access to an electronic devices.

The cutoff means includes a user interface module for locking a part of the user interface for controlling an electronic device.

The user interface is provided on the display unit 140 or a display of the terminal 200.

The device management apparatus 100 detects an unauthorized access attempt of the user having no access right by means of a sensing unit.

The sensing unit can detect the state transition of the electronic device from sleep state to wakeup state.

If the access attempt of unauthorized user is detected, the device management apparatus 100 outputs an alarm sound by means of the audio processing unit 130.

Figure 4:
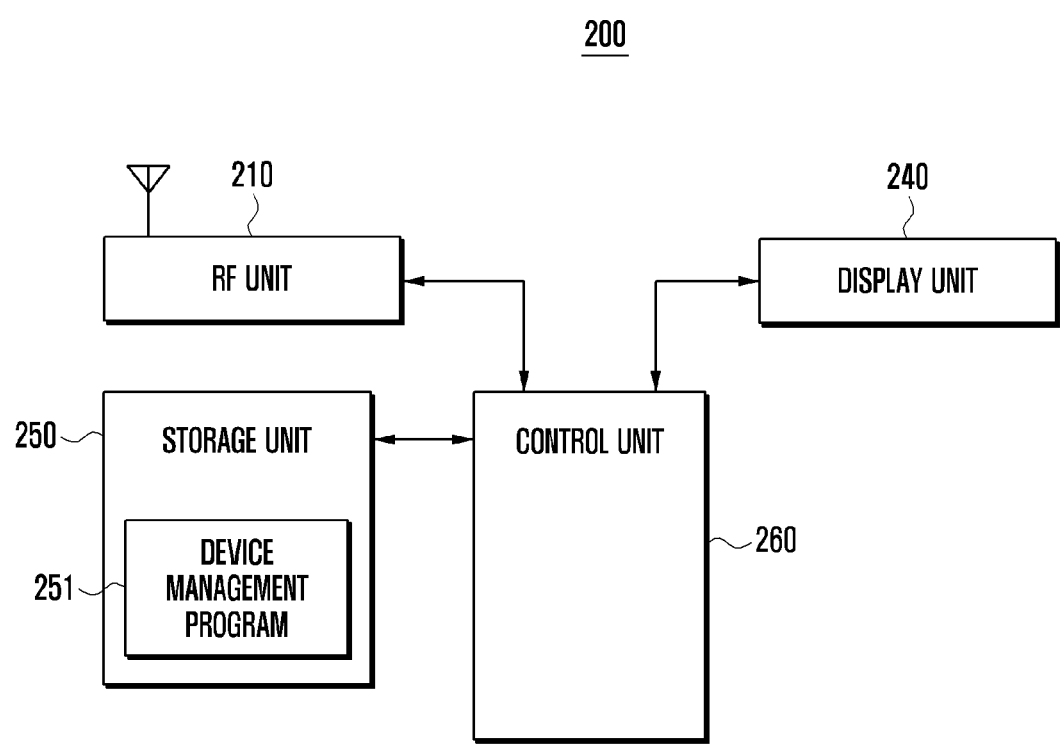
FIG. 4 is a block diagram illustrating the terminal of FIG. 1.

FIG. 4 is a block diagram illustrating the terminal of FIG. 1.

As shown in FIG. 4, the terminal 200 includes a Radio Frequency (RF) unit 210, a display unit 240, a storage unit 250, and a controller 250.

The terminal 200 according to an embodiment of the present invention receives information related to the power-on or off of the electronic devices 400 that are provided by the device management apparatus 100 and displays the received information on the display unit 240.

The terminal 200 controls the device management apparatus 100 and the electronic devices 400 remotely for power-on/off of the corresponding electronic device. The terminal 200 is configured with the functions of the device management apparatus 100 to control the power-on/off of the electronic devices 400.

The RF unit 210 is responsible for establishing a communication channel with the device management apparatus 100 to receive the information provided by the device management apparatus 100 such as electronic device configuration screen interface information, electronic device selection screen interface information, user input screen interface information, and user profile-based available electronic device selection screen interface information.

The above-described information is delivered to the control unit 260.

In the case in which the device management apparatus supports power-on or off of multiple electronic devices 400, the RF unit 210 establishes channels with respective electronic devices. The RF unit 210 is responsible for the same functions as the communication unit 110 of the device management apparatus so as to collect device information on the electronic devices 400. The collected device information is delivered to the control unit 260, and the control unit 250 is designed to generate the control signals for the electronic devices 400 instead of the device management apparatus 100. For this purpose, the RF unit 210 provides the control unit 260 with the device control information received from the server 300.

The display unit 240 displays various screens related to the operation of the terminal 200. Similar to the display unit 140 of the device management apparatus 100, the display unit 240 of the terminal 200 is implemented with a touchscreen so as be an input means.

The display unit 240 of the terminal 200 displays the information received by means of the RF unit 210 from the device management apparatus 100.

That is, the display unit 240 outputs an electronic device configuration screen interface, a user setting screen interface, and a user profile-based electronic device configuration screen interface.

The screen interfaces are generated by the terminal 100 as an application program is executed rather than received from the device management apparatus 100.

For this purpose, the storage unit 250 of the terminal 200 stores the device management program 251. The device management program 251 is also stored in the storage unit 160 of the device management apparatus 100 for controlling the electronic devices 400.

The electronic device control management program is configured to control the electronic devices 400 remotely through access to a web server considering the mobility of the terminal 200. The device management apparatus 100 works as a gateway arranged between the terminal 200 and the electronic devices and forwards the device control signal received through the web to the corresponding electronic devices. Meanwhile, the storage unit 250 stores the OS of the terminal 200 and various application programs.

The control unit 260 controls signaling for various functions of the terminal 200 in association with the control of the electronic devices 400 and information exchange and output. For example, when the terminal 200 outputs the information provided by the device management apparatus 100 on the display unit 240 and sends the user input signal to the device management apparatus, the control unit 260 receives the aforementioned screen interfaces and information by means of the RF unit 210 and output the received screen and/or information by means of the display unit 240.

The control unit 260 controls the interface output process to transmit the information in association with the item selected by the user or a configuration value input by the user. Thus, the control unit 260 displays controls display the information generated while controlling the electronic devices 400 and delivers the user command to the device management apparatus 100.

In the case in which the terminal takes the role of the device management apparatus 100, the control unit 260 acts as the control unit 170 of the device management apparatus 100 such that the terminal 200 configures the interface rendering and information output independently.

For example, the control unit 260 of the terminal 200 controls the display unit 240 to display the list of the access-restricted electronic devices according to the user profile. In the case in which the user profile-based access restriction is managed by the terminal 200, the control unit 260 of the terminal 200 categorizes the users into different usage levels and configure and control the access of the electric devices 400 according to the usage level. In the case in which multiple user profiles are collected in a predetermined range, the control unit 260 of the terminal 200 configures and controls the access to the electronic devices according to the subordinate relationship among the user profiles.

The control unit 260 establishes a communication channel for controlling the electronic devices through a network connection, especially when the terminal 200 moves out of a predetermined range where the electronic devices are located, to communicate considering the mobility of the terminal 200.

As described above, the terminal 200 according to an embodiment of the present invention outputs the information related to the control of the electronic devices 400 and processes the input signal such that the user can configure and execute the device management function and check the configuration and execution result.

The terminal 200 according to an embodiment of the present invention is responsible for providing the information on the access restriction configuration associated with the electronic devices 400 and the information related to the electronic device access restriction according to the selected user profile, on behalf of the device management apparatus 100.

Figure 5:
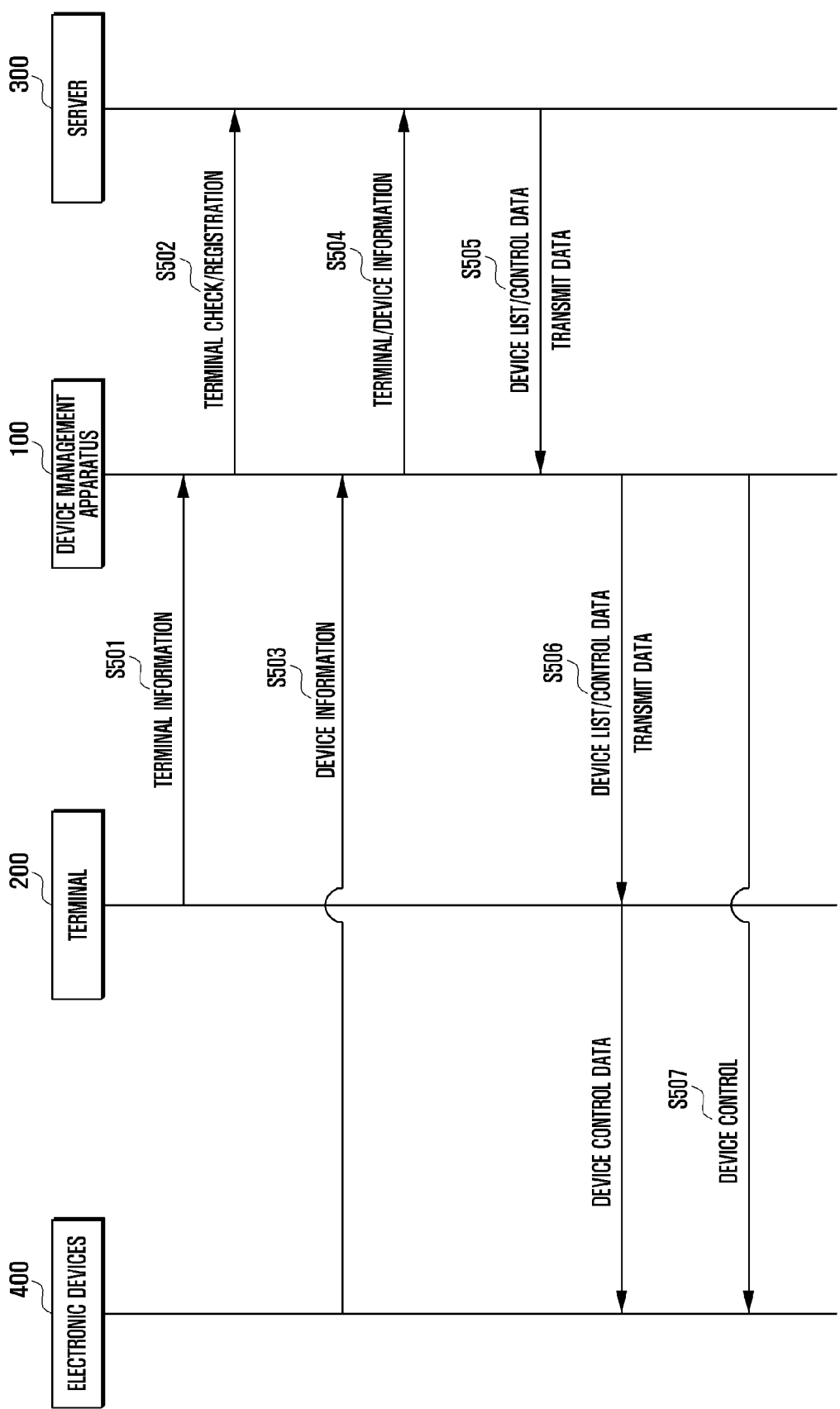
FIG. 5 is a signaling diagram illustrating a device access control method according to an embodiment of the present invention.

FIG. 5 is a signaling diagram illustrating a device access control method according to an embodiment of the present invention.

A description will now be made of the method for controlling access to the electronic devices 200 with reference to FIG. 5.

The terminal 200 transmits terminal information to the device management apparatus 100 in step S501. The device management apparatus may request the terminal 200 to transmit the terminal information.

Upon receipt of the terminal information request, the terminal 200 sends the terminal information including the profile of the terminal user to the device management apparatus 100.

The device management apparatus 100 sends the received terminal information to the server 300. The terminal information is compared with the information on the terminal registered with the server 300.

The server 300 checks the validity of the terminal information based on the comparison result and determines whether the terminal information is valid. The server 300 sends the determination result to the device management apparatus 100.

If the terminal is not registered with the server 300, the server 300 queries whether to register the terminal 200 with the server 300. The device management apparatus 100 sends the query message to the terminal 200 such that the terminal user decides whether to register the terminal with the server 300.

Each electronic device 400 sends the device information to the terminal 200 or the device management apparatus 100 in step S503. In the case in which the device information is sent to the terminal 200, the terminal 200 forwards the device information to the device management apparatus 100.

If the device information is received from the electronic device 400 or the terminal 200, the device management apparatus 100 forwards the device information to the server 300.

The device management apparatus 100 compares the device information with the terminal information to determine whether the terminal 200 can connect to the electronic device 400.

When it is determined that it is difficult for the terminal 200 to connect to the electronic device 400, the device management apparatus 100 sends the device information and the terminal information to the server 300 such that the server 300 analyzes the information in step S504.

The server 300 compares the terminal information and the device information with the registered terminal information to determine whether the terminal 200 can access the electronic device.

If multiple device information is received, the server 300 creates a list of the electronic devices accessible based on the previously registered terminal information in step S505.

The server 300 also generates control data applicable to the electronic device list.

The generated device list and control data is sent from the server 300 to the device management apparatus 100.

The device management apparatus 100 controls the electronic devices 400 by means of the terminal 200 based on the received device list and control data in step S506. That is, the device management apparatus 100 sends the device list and control data to the terminal 200, and the terminal 200 controls the electronic device 400 based on the received device list and control data.

The device management apparatus 100 sends the received control data to the electronic devices included in the device list to control the electronic devices directly in step S507.

The control method is to deactivate or hide the icons representing the electronic devices on the screen such that the user cannot access such corresponding electronic devices.

Another control method cuts off the power to the electronic devices included in the device list.

Yet another control method is to lock a part of the user interface for controlling the electronic devices.

In the case in which a plurality of terminals coexist in an area, the information on one of the plural terminals is selected as described with reference to FIG. 3.

A description is made of the screen interfaces that are displayed on the display unit of the device management apparatus and the terminal in detail hereinafter. The following description is directed to the screen interface on the display unit 240 of the terminal 200.

If the screen interface of the terminal 200 is used, this means that the terminal information, i.e. the user is identified.

Figure 6:
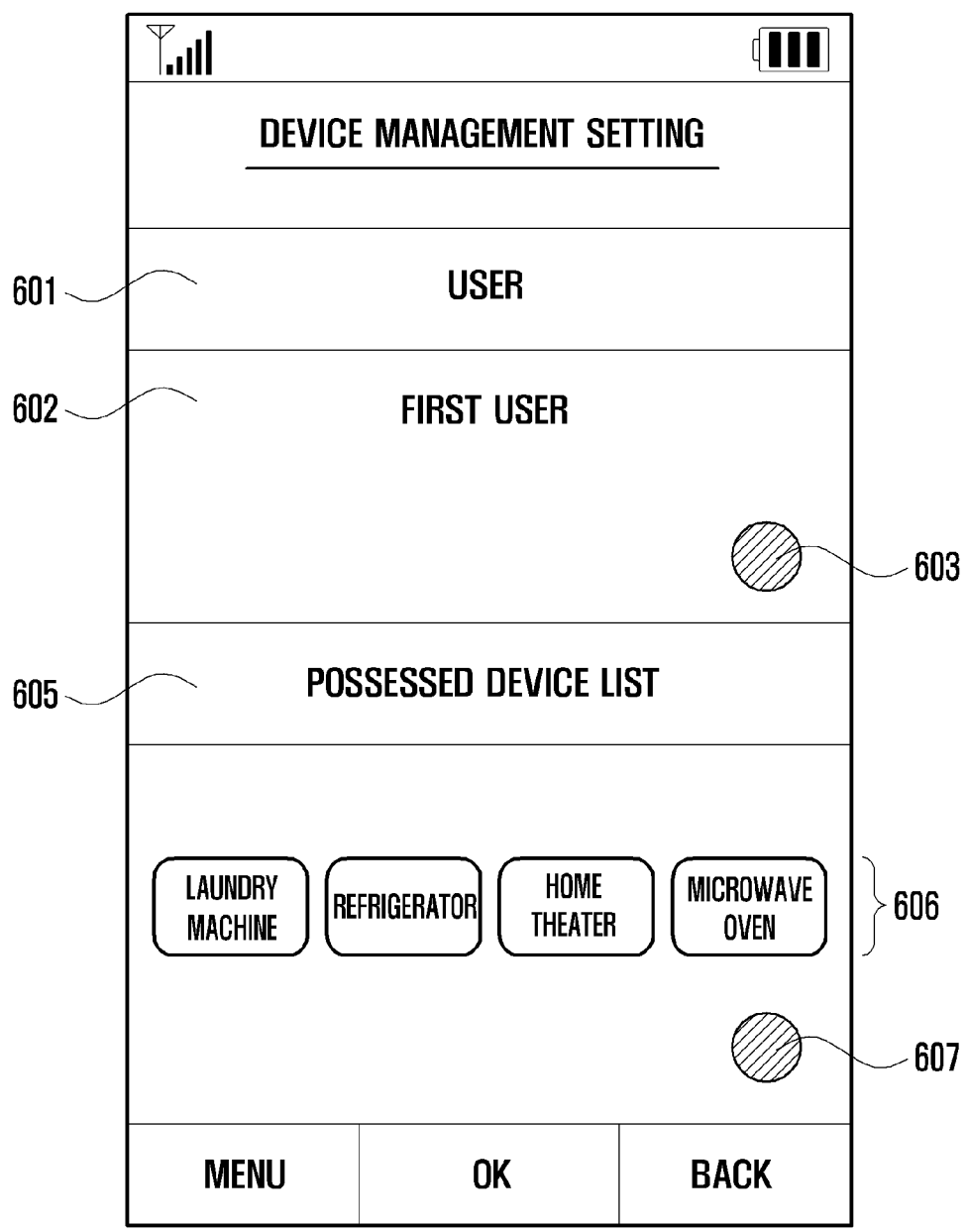
FIG. 6 is a diagram illustrating a screen providing a device management configuration interface according to an embodiment of the present invention.

FIG. 6 is a diagram illustrating a screen providing a device management configuration interface according to an embodiment of the present invention.

The user generates an input signal for controlling the electronic devices 400 by means of the terminal 200.

The terminal 200 provides the user with menu items for device management configuration and receives the screen interfaces by manipulating the menu items as shown in FIG. 6.

Referring to FIG. 6, the display unit 240 displays a user list 601 and a possessed device list.

In order to create the lists, the terminal 200 collects the information regarding the electronic devices 400 directly or receives the device information from the device management apparatus 100.

If the device information of the plural electronic devices 400, the terminal 200 assigns indices (or icons or widgets) to the devices and displays the indices as the items of the possessed device list 605 on the display unit 240.

The electronic devices 400 are represented by the icons 606 as the items included in the device list 605.

The icons 606 appear as activated or deactivated according to the user profile.

If an icon is activated, the user has the access right to the electronic device represented by the icon. Otherwise, if an icon is deactivated, the user has no access right to the electronic device represented by the icon.

In order for the user to add a new electronic device to the device list, a new device icon 607 is provided.

The user adds a new electronic device by entering the title and/or model of the electronic device using the user interface of the terminal 200.

The user list 601 shows users having the access right to the electronic devices represented by the icons 606 on the terminal 200.

In the case of FIG. 6, the first user 602 is registered with the user list 601.

If the first user 602 is selected in the user list 601, the icons representing the electronic devices possessed by the first user 602 are activated among the entire icons 606 in the device list 605.

The user list 601 is provided with a new user icon 603 in order for the user to add a new user.

The icons 606 representing the electronic devices is changed, if necessary, according to user preference and lifestyle and edited according to the types of the electronic devices 400.

The electronic devices registered according to the user information is edited.

Figure 7:
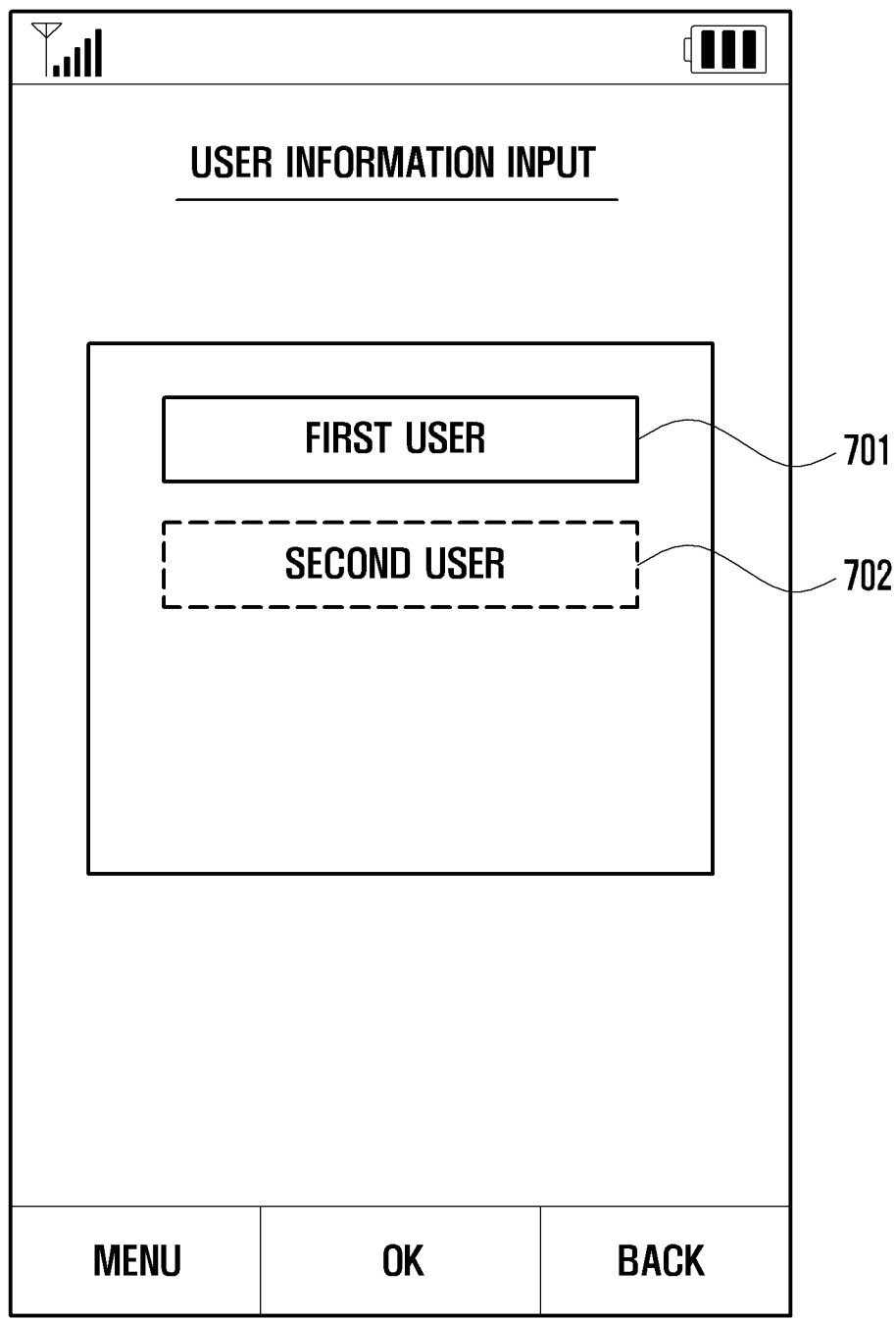
FIG. 7 is a diagram illustrating a screen providing a user information input interface according to an embodiment of the present invention.

FIG. 7 is a diagram illustrating a screen providing a user information input interface according to an embodiment of the present invention.

If the new user icon 603 is selected on the device management configuration interface screen of FIG. 6, the user information input interface screen is displayed as shown in FIG. 7.

The first user 701 is the user registered with the terminal 200 already, and the second user 702 is the user to be newly registered using the terminal 200.

The user information input interface screen is provided with the input boxes to receive the information such as age, favorite devices, and access-restricted devices of the user to be registered.

The devices to which access is allowed by the user are selected automatically based on the user information.

Figure 8:
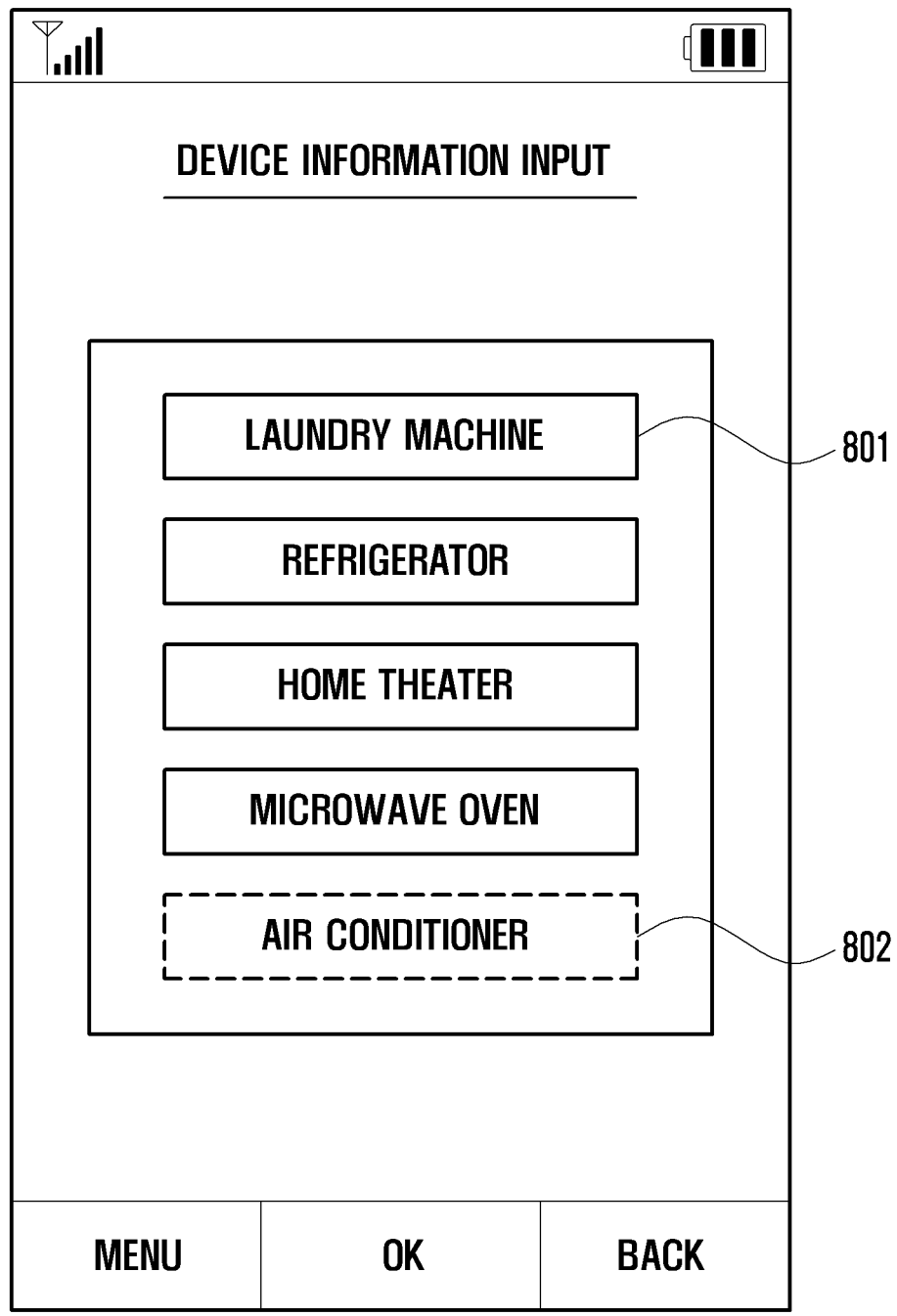
FIG. 8 is a diagram illustrating a screen providing a device information input interface according to an embodiment of the present invention.

FIG. 8 is a diagram illustrating a screen providing a device information input interface according to an embodiment of the present invention.

If the new device icon 607 is selected on the device management configuration interface screen of FIG. 6, the device information input interface screen is displayed as shown in FIG. 8.

The laundry machine 801, refrigerator, home theater, and microwave oven are electronic devices registered with the terminal 200 already, and the air conditioner 802 is the electronic device to be newly registered with the terminal 200.

The device information input interface screen is provided with the input boxes to receive the identity number, model, manufacturer, and product name of the electronic device.

Figure 9:
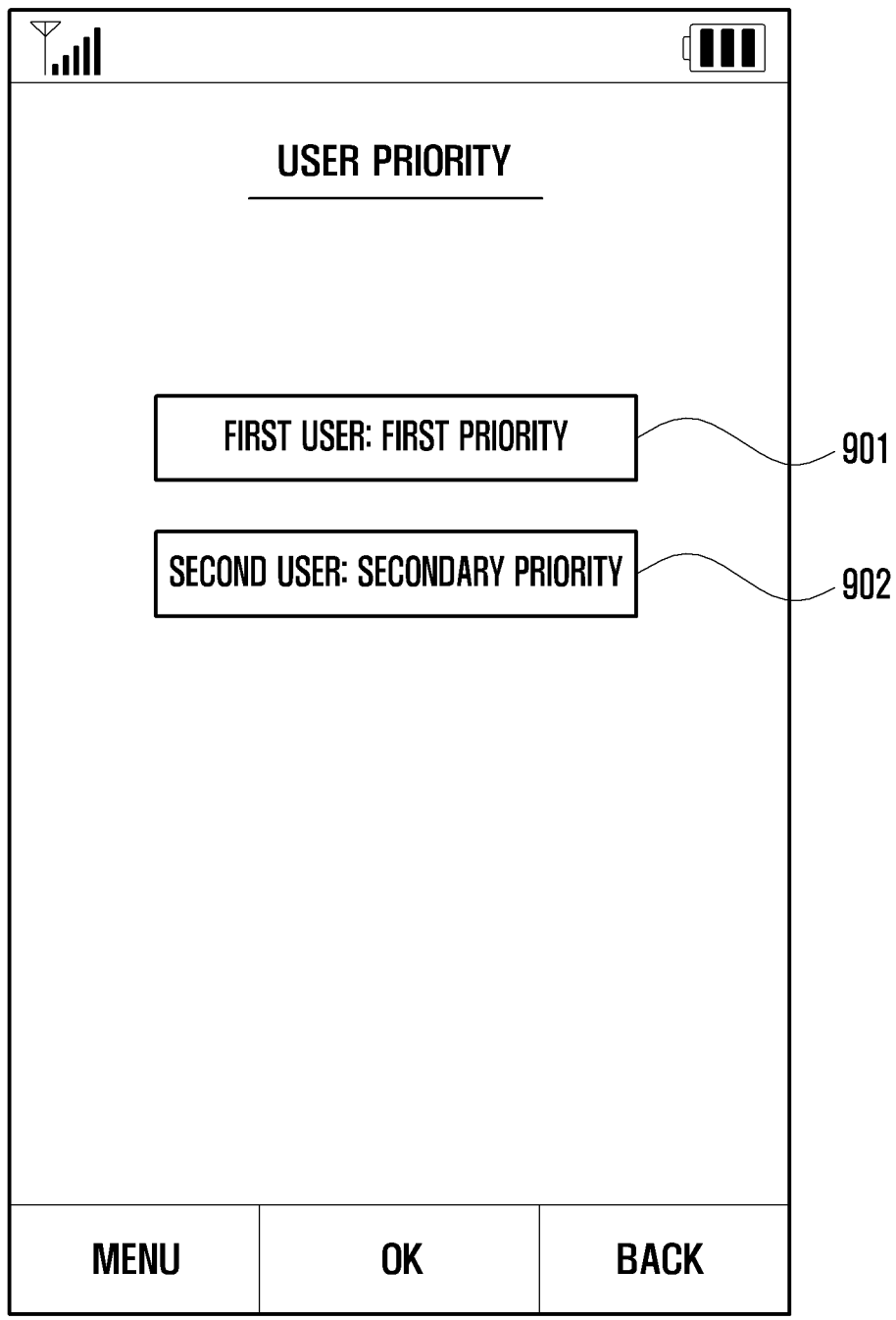
FIG. 9 is a diagram illustrating a screen providing a user priority configuration interface according to an embodiment of the present invention.

FIG. 9 is a diagram illustrating a screen providing a user priority configuration interface according to an embodiment of the present invention.

If an adult and a child are in the same area, the device management apparatus 100 grants the access rights for the electronic devices 400 based on the user profile of the adult having higher level.

If the access right to the electronic devices 400 is granted based on the user profile of the child, the adult may not use the electronic device to which the adult has the usage level higher enough.

If an impaired adult and a child are in the same area, the device management apparatus grants the access right for the electronic devices 400 based on the user profile of the child.

Referring to FIG. 9, the first priority 901 is assigned to the first user as an adult while the second priority 902 is assigned to the second user as a child.

When the first user is out of the system operation area, the device management apparatus 100 configures the access restriction to the electronic devices 400 based on the user profile of the second user.

If two users are in the system operation area, the device management apparatus 100 configures the access restriction to the electronic devices 400 based on the user profile of the user having the usage level higher than that of the other.

For example, if both the first and second users 701 and 702 are in the system operation area, the device management apparatus configures the access restriction to the electronic devices 400 based on the user profile of the first user 701 having the usage level higher than that of the second user 702.

The access priority are changed through the user interface of the terminal 200 for user's convenience.

The restriction configuration for the electronic devices is changed according to the user information and/or operation area environment.

Figure 10:
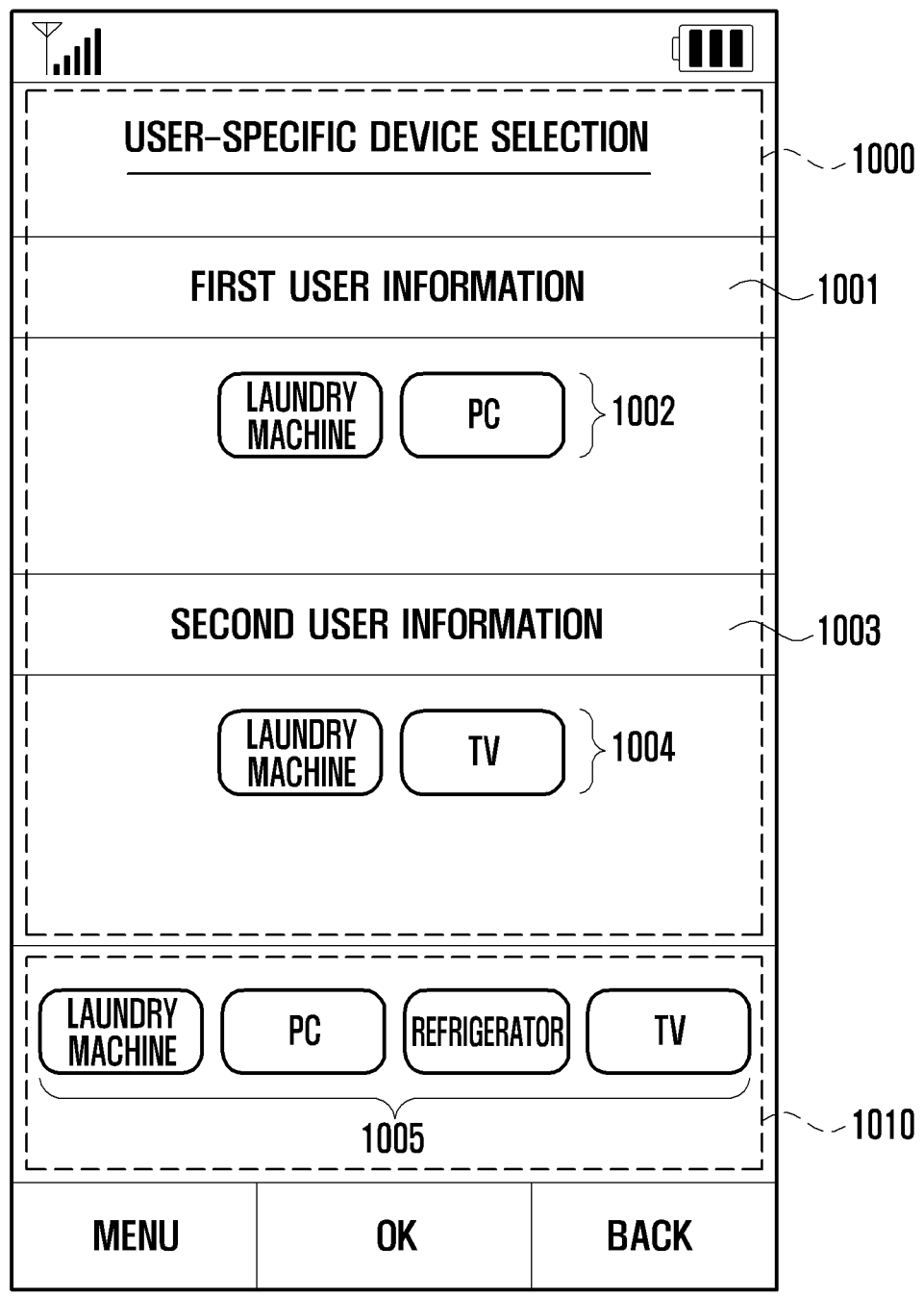
FIG. 10 is a diagram illustrating a screen providing per-user accessible device selection interface according to an embodiment of the present invention.

FIG. 10 is a diagram illustrating a screen providing per-user accessible device selection interface according to an embodiment of the present invention.

The per-user accessible device selection interface is divided into a first region 1000 and a second region 1010.

The first region 1000 shows user-specific device lists 1001 and 1003 having device icons 1002 and 1004 respectively.

The second region 1010 shows device icons 1005 of all of the devices available in the operation area.

The user-specific device lists 1001 and 1003 were created through the interfaces as shown in FIGS. 7 and 8.

The icons 1005 arranged in the second region 101 is moved to the first area 1000 to grant the corresponding user the access right to the electronic device represented by the moved icon.

For example, if the user drags an icon representing the TV from the second region 1010 and drops the icon in the first user's device list 1001, the first user is granted the access right to the TV. If the user drags an icon representing the laundry machine from the second region 1010 and drops the icon in the second user's device list 1003, the second user is granted the access right to the laundry machine.

Moreover, the device icons registered with the user device lists 1001 and 1003 is dragged from the first region 1000 and dropped in the second region 1010 to restrict the user's access to the electronic devices represented by the moved device icons. That is, the user's access right to the electronic device of which icon disappears from the user's device list is withdrawn.

For example, if the first user drags the icon representing the PC from the first user's device list 1001 and drops the icon 1002 in the second region 1010, the first user's access right to the PC is withdrawn. If the second user drags the icon representing the refrigerator from the second user's device list 1003 and drops the icon in the second region 1010, the second user's access right to the refrigerator is withdrawn.

Figure 11:
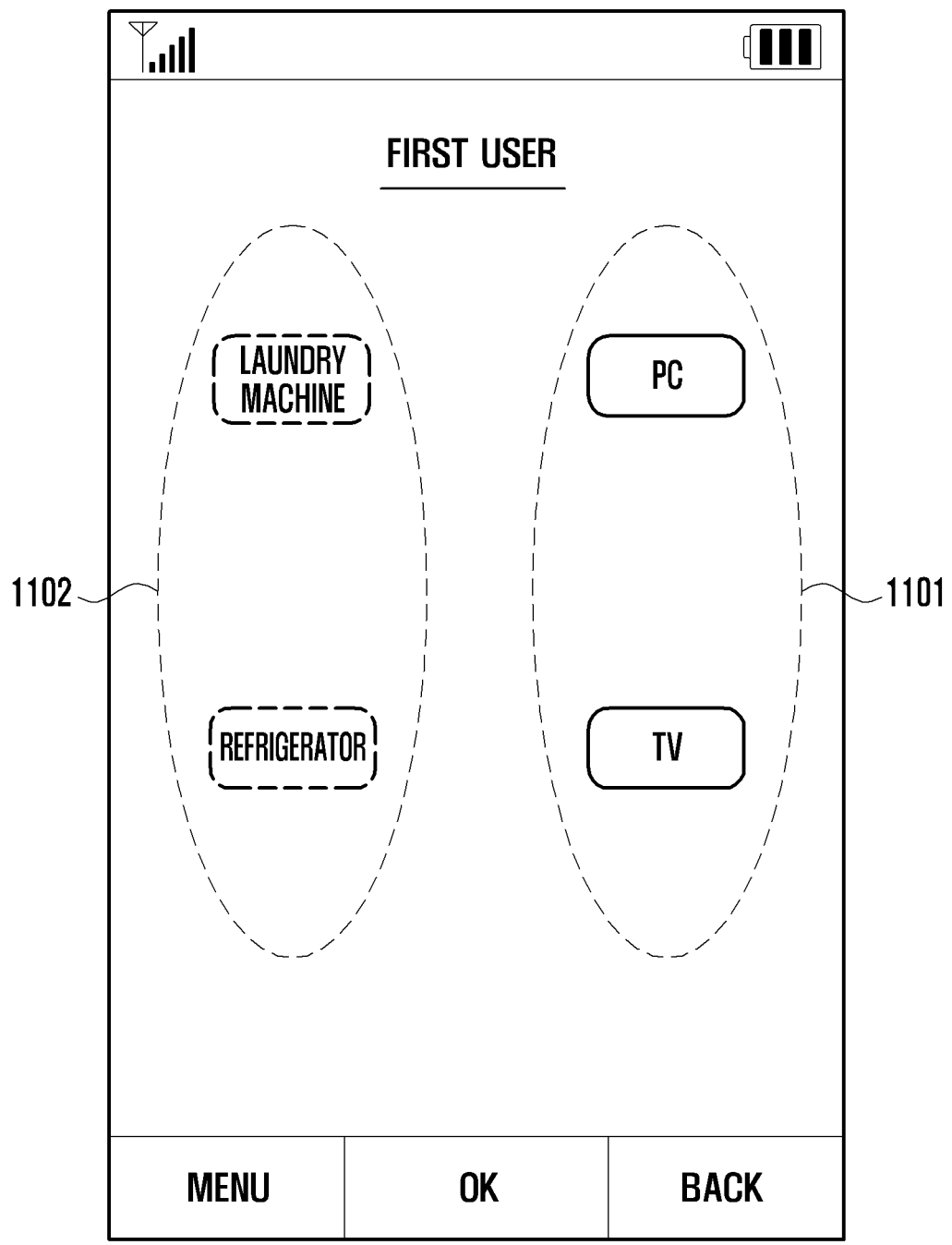
FIG. 11 is a diagram illustrating a screen providing a user-specific device management interface according to an embodiment of the present invention.

FIG. 11 is a diagram illustrating a screen providing a user-specific device management interface according to an embodiment of the present invention.

Once the device configurations have been completed as described with reference to FIG. 10, the accessible electronic devices and non-accessible electronic devices of the first user are shown on the user-specific device management interface screen in the form of activated and deactivated icons.

A group 1101 of solid line icons representing the PC and TV express the accessible electronic devices, and a group 1102 of dotted line icons representing the laundry machine and refrigerator may express the non-accessible electronic device.

The accessible electronic device icons and non-accessible electronic device icons is distinguished from one another by applying different colors, different fonts, or different sizes, or hiding the non-accessible electronic device icons.

Figure 12:
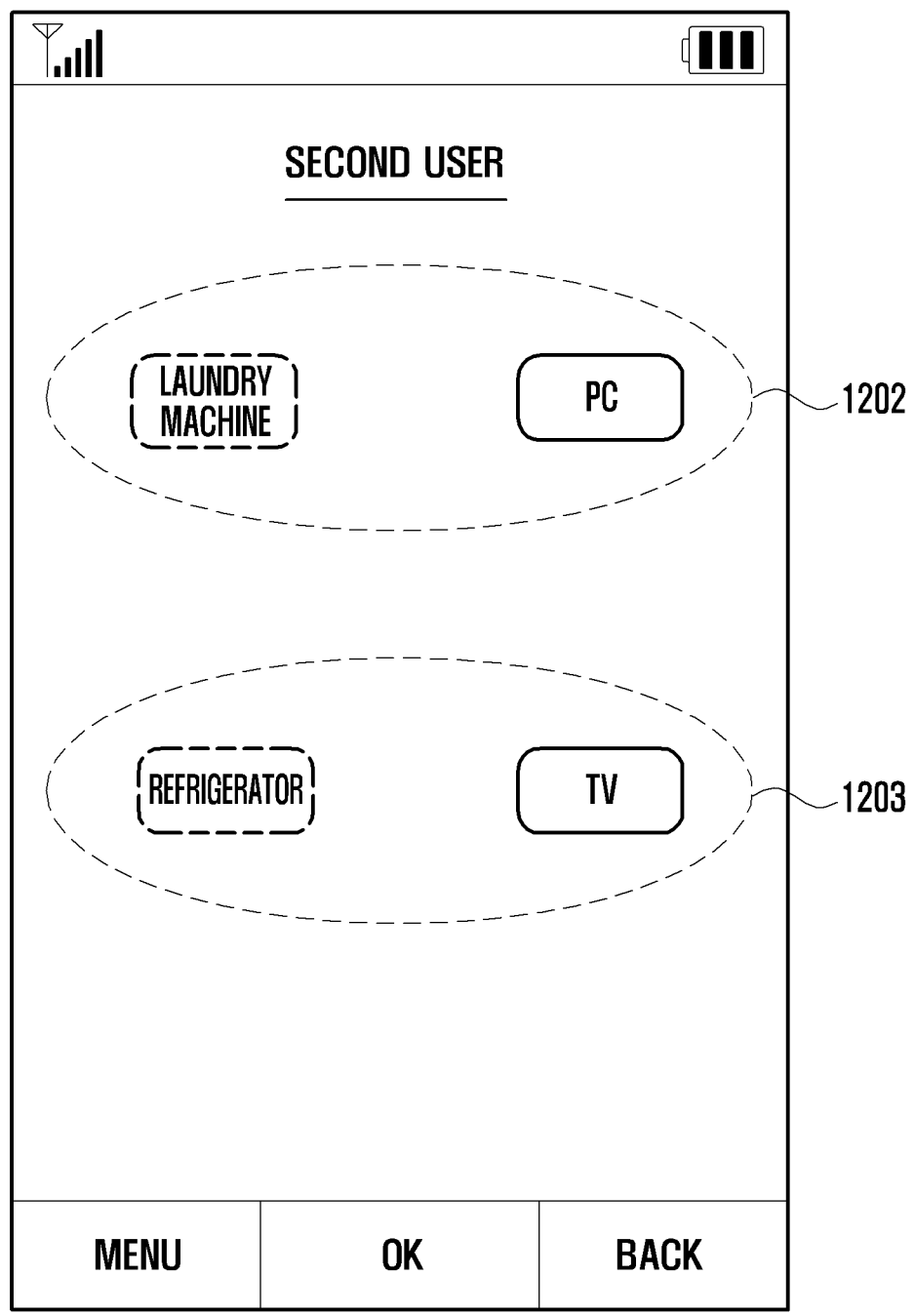
FIG. 12 is a diagram illustrating a screen providing a user-specific device management interface according to another embodiment of the present invention.

FIG. 12 is a diagram illustrating a screen providing a user-specific device management interface according to another embodiment of the present invention.

Similarly to the embodiment of FIG. 11, the accessible electronic devices of the second user are placed into a group 1202 and non-accessible electronic devices of the second user are placed into a group 1203.

The second user or another user may restrict the second user's access to the PC.

For example, the PC icon belonged to the group 1202 is deleted or configured to be disabled.

Figure 13:
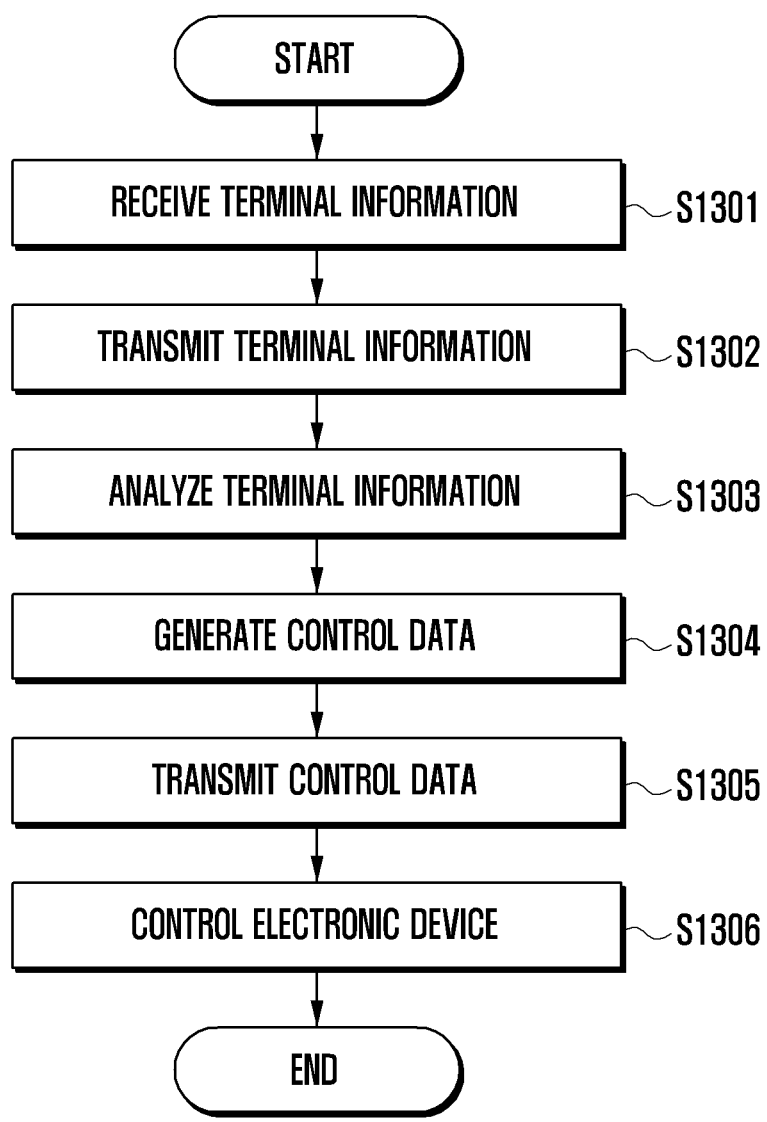
FIG. 13 is a flowchart illustrating a user profile-based device access control method according to an embodiment of the present invention.

FIG. 13 is a flowchart illustrating a user profile-based device access control method according to an embodiment of the present invention.

The flowchart illustrated in FIG. 13 shows the procedure similar to the signaling diagram of FIG. 5. The device management apparatus 100 receives terminal information from the terminal 200 in step S1301.

The device management apparatus 100 checks the user profiles of the users located within a predetermined area based on the terminal information.

The device management apparatus 100 then forwards the terminal information to the server 300 in step S1302.

In the case in which the multiple terminal information is received in step 1301, the device management apparatus 100 assigns priorities to the users.

The server 300 analyzes the received terminal information to check the users of the terminal 200 in step S1303.

In step S1303, the server 300 also compares the received terminal information with previously stored terminal information to acquire the profile of the user of the terminal 200.

In the case in which the multiple terminal information exist, the server 300 assigns priorities to the users.

The server 300 creates a list of the electronic devices 400 which the user of the terminal can use based on the terminal information in step S1304.

The server 300 creates the control data matching the created electronic device list.

The electronic devices power on or off based on the control data, or the access to the electronic devices is permitted or rejected by means of the terminal 200.

The control data includes the electronic device power-on/off data and electronic device list.

The server 300 then sends the control data to the device management apparatus 100 in step S1305.

The device management apparatus 100 sends the control data to the electronic devices 400 to control the electronic devices in step S1306.

The device management apparatus 100 also sends the control data to the terminal 200.

In this case, the UE 200 selects the electronic device to be controlled based on the control data.

The terminal 200 controls the selected electronic device based on the received control data.

As described above, the user profile-based device access control method and apparatus of the present invention is capable of controlling the access and usage right to the electronic devices based on the user information in the system including a plurality of devices, a device management apparatus, and terminals, and a server. Further, the user profile-based access control method and apparatus of the present invention is capable of controls the access rights to a plurality of electronic devices based on the user profile. Furthermore, the user profile-based access control method and apparatus of the present invention is capable of discriminating among the users and controlling the use of the devices based on the user profile, thereby improving usage safety and device protection and promoting safe utilization of the electronic devices.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. A method for controlling electronic devices, the method comprising:
    collecting, at a device management apparatus, device information of the electronic devices from the electronic devices and information of a mobile device from the mobile device;
    obtaining, at the device management apparatus, user information of the mobile device from the information of the mobile device;
    providing, at the device management apparatus, a list of the electronic devices to be controlled by the mobile device with the mobile device according to the device information of the electronic devices and the user information of the mobile device; and
    controlling, at the device management apparatus, at least one of the electronic devices in the list of the electronic devices according to an access request from the mobile device,
    wherein controlling at least one of the electronic devices in the list of the electronic devices comprises restricting access of the mobile device to the electronic devices according to a hierarchical relationship in accordance with the user information.

2. The method of claim 1, wherein controlling at least one of the electronic devices in the list of the electronic devices comprises:
    categorizing the user information into a usage level; and
    restricting access of the mobile device to the electronic devices according to the usage level.

3. The method of claim 1, wherein controlling at least one of the electronic devices in the list of the electronic devices comprises restricting access of the mobile device to the electronic devices by cutting off power to corresponding electronic devices.

4. The method of claim 1, wherein controlling at least one of the electronic devices in the list of the electronic devices comprises disabling a part of a user interface for controlling corresponding electronic devices.

5. The method of claim 1, wherein controlling at least one of the electronic devices in the list of the electronic devices comprises hiding an icon representing corresponding electronic devices on a user interface for controlling the corresponding electronic devices.

6. A device management apparatus, the apparatus comprising:
    a communication unit for collecting device information of electronic devices from the electronic devices and information of a mobile device from the mobile device, and providing a list of the electronic devices available to be controlled by the mobile device to the mobile device; and
    a control unit for controlling the communication unit to collect the device information of the electronic devices and the information of the mobile device and obtain user information of the mobile device from the information of the mobile device and controlling the communication unit to provide a list of the electronic devices to be controlled by the mobile device to the mobile device according to the device information of the electronic devices and the user information of the mobile device, and controlling at least one of the electronic devices according to an access request from the mobile device,
    wherein the control units restricts access of the mobile device to the at least one of the electronic devices according to a hierarchical relationship in accordance with the user information.

7. The device management apparatus of claim 6, wherein the control unit categorizes the user information into a usage level and restricts access of the mobile device to the at least one of the electronic devices according to the usage level.

8. The device management apparatus of claim 6, wherein the control unit comprises:
    a switch control module for controlling power supply to the at least one of the electronic devices; and
    a user interface module for supporting controlling of blocking access of the mobile device to the at least one of the electronic devices.

9. The device management apparatus of claim 6, wherein the control unit cuts off power supply to the at least one of the electronic devices.

10. The device management apparatus of claim 6, wherein the control unit disables a part of a user interface for controlling the at least one of the electronic devices.

11. The device management apparatus of claim 6, wherein the control unit hides an icon representing the at least one of the electronic devices on a user interface for controlling the at least one of the electronic devices.

12. The device management apparatus of claim 6, further comprising:
    an output unit for outputting an alarm sound when an access attempt of the mobile device to an access-restricted electronic device is detected.

13. A mobile device for controlling an access of a mobile device to electronic devices, the terminal comprising:
    a storage unit for storing user information including a predetermined usage level;
    a Radio Frequency (RF) unit for collecting device information of the electronic devices;
    a display unit for displaying a list of electronic devices to be controlled by the mobile device; and
    a control unit for controlling the display unit to display the list of electronic devices to be controlled by the mobile device according to the device information and the user information, and transmitting an access request signal to a device management apparatus to control at least one of the electronic devices,
    wherein the control units restricts access of the mobile device to the electronic devices according to a hierarchical relationship in accordance with the user information.

14. The terminal of claim 13, further comprising:
    a communication unit for sending the user information to the device management apparatus.

15. The terminal of claim 13, wherein the control unit categorizes the user information into a usage level and restricts the access of the mobile device to the electronic devices based on the usage level.

16. A non-transitory computer readable recording medium having recorded thereon a computer program for executing a method for controlling electronic devices, the method comprising:

- collecting, at a device management apparatus, device information of the electronic devices from the electronic devices and information of a mobile device from the mobile device;
- obtaining, at the device management apparatus, user information of the mobile device from the information of the mobile device;
- providing, at the device management apparatus, a list of the electronic devices to be controlled by the mobile device to the mobile device according to the device information of the electronic devices and the user information of the mobile device; and
- controlling, at the device management apparatus, at least one of the electronic devices according to an access request from the mobile device,
- wherein controlling at least one of the electronic devices in the list of the electronic devices comprises restricting access of the mobile device to the electronic devices according to a hierarchical relationship in accordance with the user information.

\* \* \* \* \*